(12) United States Patent
Weinberg et al.

(10) Patent No.: US 9,275,019 B2
(45) Date of Patent: Mar. 1, 2016

(54) SYSTEM AND METHOD FOR PERFORMING UNICODE MATCHING

(75) Inventors: Paul N. Weinberg, Los Angeles, CA (US); Richard T. Endo, Los Angeles, CA (US); Xidong Zheng, San Gabriel, CA (US); Nathan F. Yospe, Glendale, CA (US); Ariel Hazi, Los Angeles, CA (US)

(73) Assignee: SAP SE, Walldorf (DE)

( * ) Notice: Subject to any disclaimer, the term of this patent is extended or adjusted under 35 U.S.C. 154(b) by 2479 days.

(21) Appl. No.: 11/963,682

(22) Filed: Dec. 21, 2007

(65) Prior Publication Data

US 2009/0164455 A1 Jun. 25, 2009

(51) Int. Cl.
| | |
|---|---|
| G06F 7/00 | (2006.01) |
| G06F 17/30 | (2006.01) |
| G06T 11/00 | (2006.01) |
| G06F 17/22 | (2006.01) |

(52) U.S. Cl.
CPC .................................. G06F 17/2211 (2013.01)

(58) Field of Classification Search
None
See application file for complete search history.

(56) References Cited

U.S. PATENT DOCUMENTS

| | | | | |
|---|---|---|---|---|
| 5,440,482 A | * | 8/1995 | Davis | 715/226 |
| 6,263,333 B1 | * | 7/2001 | Houchin et al. | |
| 6,654,733 B1 | * | 11/2003 | Goodman et al. | 706/52 |
| 6,864,809 B2 | * | 3/2005 | O'Dell et al. | 341/28 |
| 7,260,574 B2 | * | 8/2007 | McConnell et al. | |
| 7,376,752 B1 | * | 5/2008 | Chudnovsky et al. | 709/245 |
| 2004/0006569 A1 | * | 1/2004 | Carlin et al. | 707/101 |
| 2005/0171949 A1 | * | 8/2005 | McConnell et al. | 707/7 |
| 2005/0182752 A1 | * | 8/2005 | Rojer | 707/2 |
| 2006/0274051 A1 | * | 12/2006 | Longe et al. | 345/173 |
| 2007/0185859 A1 | * | 8/2007 | Flowers et al. | 707/5 |

OTHER PUBLICATIONS

Gonzaolo Navarro; A Guided Tour to Approximate String Matching;Mar. 2001; ACM; vol. 33 Issue 1; pp. 1-10.*
IBM; Using Phonetic values to validate Search criteria for Chinese/Vietnamese/Korean/Japanese Languages;2007; IP.com; pp. 1-3.*

* cited by examiner

*Primary Examiner* — Mariela Reyes
*Assistant Examiner* — Jermaine Mincey
(74) *Attorney, Agent, or Firm* — Buckley, Maschoff & Talwalkar LLC

(57) ABSTRACT

System and method for performing Unicode matching for comparing and merging similar data objects having Unicode strings that are equivalent yet not exact matches. Unicode characters are characterized by number of strokes, stroke order, radicals, geometry, phonemes in association with input method editor and keyboard characteristics such as location of a character on an IME or keyboard (or number of GUI interface interactions used in entering the character, e.g., via tapping where "a" on a mobile device keyboard takes 1 tap of a key, "b" takes 2 taps). These characteristics associated with code points and IME's/keyboards are utilized to create sub-domains for matching and determining "distance" to other Unicode code points (e.g., number of keyboard keys away). Allows for determining whether close, yet incorrect data entry may have taken place. Enables merging of duplicate data objects into master data object where minor differences or spelling errors introduce actually represent duplicate data.

9 Claims, 11 Drawing Sheets

|  |  | ひらがな Hiragana |  |  |  |  |  |  |  |  |  | かたかな Katakana |  |  |  |  |  |  |  |  |  |
|---|---|---|---|---|---|---|---|---|---|---|---|---|---|---|---|---|---|---|---|---|---|---|
| Seion |  | あ | a | い | i | う | u | え | e | お | o | ア | a | イ | i | ウ | u | エ | e | オ | o |
|  |  | か | ka | き | ki | く | ku | け | ke | こ | ko | カ | ka | キ | ki | ク | ku | ケ | ke | コ | ko |
|  |  | さ | sa | し | shi | す | su | せ | se | そ | so | サ | sa | シ | shi | ス | su | セ | se | ソ | so |
|  |  | た | ta | ち | chi | つ | tsu | て | te | と | to | タ | ta | チ | chi | ツ | tsu | テ | te | ト | to |
|  |  | な | na | に | ni | ぬ | nu | ね | ne | の | no | ナ | na | ニ | ni | ヌ | nu | ネ | ne | ノ | no |
|  |  | は | ha | ひ | hi | ふ | fu | へ | he | ほ | ho | ハ | ha | ヒ | hi | フ | fu | ヘ | he | ホ | ho |
|  |  | ま | ma | み | mi | む | mu | め | me | も | mo | マ | ma | ミ | mi | ム | mu | メ | me | モ | mo |
|  |  | や | ya |  |  | ゆ | yu |  |  | よ | yo | ヤ | ya |  |  | ユ | yu |  |  | ヨ | yo |
|  |  | ら | ra | り | ri | る | ru | れ | re | ろ | ro | ラ | ra | リ | ri | ル | ru | レ | re | ロ | ro |
|  |  | わ | wa |  |  |  |  |  |  | を | wo | ワ | wa |  |  |  |  |  |  | ヲ | wo |
|  |  | ん | n |  |  |  |  |  |  |  |  | ン | n |  |  |  |  |  |  |  |  |
| Dakuon |  | が | ga | ぎ | gi | ぐ | gu | げ | ge | ご | go | ガ | ga | ギ | gi | グ | gu | ゲ | ge | ゴ | go |
|  |  | ざ | za | じ | ji | ず | zu | ぜ | ze | ぞ | zo | ザ | za | ジ | ji | ズ | zu | ゼ | ze | ゾ | zo |
|  |  | だ | da | ぢ | di(ji) | づ | du(zu) | で | de | ど | do | ダ | da | ヂ | di(ji) | ヅ | du(zu) | デ | de | ド | do |
|  |  | ば | ba | び | bi | ぶ | bu | べ | be | ぼ | bo | バ | ba | ビ | bi | ブ | bu | ベ | be | ボ | bo |
| HanD |  | ぱ | pa | ぴ | pi | ぷ | pu | ぺ | pe | ぽ | po | パ | pa | ピ | pi | プ | pu | ペ | pe | ポ | po |
| Yoon | Seion | きゃ | kya |  |  | きゅ | kyu |  |  | きょ | kyo | キャ | kya |  |  | キュ | kyu |  |  | キョ | kyo |
|  |  | しゃ | sha |  |  | しゅ | shu |  |  | しょ | sho | シャ | sha |  |  | シュ | shu |  |  | ショ | sho |
|  |  | ちゃ | cha |  |  | ちゅ | chu |  |  | ちょ | cho | チャ | cha |  |  | チュ | chu |  |  | チョ | cho |
|  |  | にゃ | nya |  |  | にゅ | nyu |  |  | にょ | nyo | ニャ | nya |  |  | ニュ | nyu |  |  | ニョ | nyo |
|  |  | ひゃ | hya |  |  | ひゅ | hyu |  |  | ひょ | hyo | ヒャ | hya |  |  | ヒュ | hyu |  |  | ヒョ | hyo |
|  |  | みゃ | mya |  |  | みゅ | myu |  |  | みょ | myo | ミャ | mya |  |  | ミュ | myu |  |  | ミョ | myo |
|  |  | りゃ | rya |  |  | りゅ | ryu |  |  | りょ | ryo | リャ | rya |  |  | リュ | ryu |  |  | リョ | ryo |
|  | Dakuon | ぎゃ | gya |  |  | ぎゅ | gyu |  |  | ぎょ | gyo | ギャ | gya |  |  | ギュ | gyu |  |  | ギョ | gyo |
|  |  | じゃ | ja |  |  | じゅ | ju |  |  | じょ | jo | ジャ | ja |  |  | ジュ | ju |  |  | ジョ | jo |
|  |  | ぢゃ | ja |  |  | ぢゅ | ju |  |  | ぢょ | jo | ヂャ | ja |  |  | ヂュ | ju |  |  | ヂョ | jo |
|  |  | びゃ | bya |  |  | びゅ | byu |  |  | びょ | byo | ビャ | bya |  |  | ビュ | byu |  |  | ビョ | byo |
|  | HD | ぴゃ | pya |  |  | ぴゅ | pyu |  |  | ぴょ | pyo | ピャ | pya |  |  | ピュ | pyu |  |  | ピョ | pyo |

掛けうどん  かけうどん        noodles in broth
kake udon  kakeudon

掛け饂飩  かけうどん        noodles in broth
kake udon  kakeudon

SYSTEM AND METHOD FOR PERFORMING UNICODE MATCHING

BACKGROUND OF THE INVENTION

1. Field of the Invention

Embodiments of the invention described herein pertain to the field of computer systems. More particularly, but not by way of limitation, one or more embodiments of the invention enable a system and method for performing Unicode matching for comparing and merging similar data objects having Unicode strings that are equivalent yet not exact matches.

2. Description of the Related Art

Data objects are database entities that represent objects such as products for example. Data objects may be constructed in a database with number fields, string fields and other field types associated with different types of data such as binary large objects or images for example.

Duplicate data objects in databases occur when two or more data objects exist in a database that actually represent the same object. These duplicate data objects have similar, yet slightly different values in one or more fields that make up the database object. Duplicate data objects are created for example via incorrect data entry or merging of systems that contain slightly different versions of data objects. One such scenario occurs when data objects are entered into a database with string fields that have typographic errors, abbreviations, omissions or transpositions for example. Consolidating duplicate data objects preserves data integrity and minimizes costs associated with maintaining duplicate data objects.

Database object string fields hold characters that represent words in a desired language, for example English. English characters may be encoded using the American Standard Code for Information Interchange (ASCII). Checking words for near matches in ASCII encoded strings is relatively easy since the problem domain is so small, i.e., there are only 128 characters and words are built character by character. In other languages where a single data value represents an entire word, there is no previously known method for determining how "close" one word is to another. This is true since the encoding for the word does not include any of the characteristics of the word such as sound, number of strokes, radicals, geometry or any other characteristic that can be utilized to determine how closely related one word is to another. One such measure of how close one word is to another relates to how "far apart" the two words are in an input method editor graphical user interface, whereby a user may erroneously select one word instead of another, e.g., be "off" by one list entry when selecting a given word.

Traditional Chinese for example includes over 40,000 logograms which represent words. Chinese along with other languages are therefore not capable of being encoded in such a small range of values as are alphabet based languages since an ASCII character readily fits in an 8 bit word, while traditional Chinese requires at least two 8 bit words. Furthermore, Chinese using Basic Multilingual Plane (BMP) encoded in UTF-8 requires up to three 8 bit words in binary computer memory. Japanese is another logogram based language. These types of logogram based languages are generally encoded in "Unicode" for storage of text in databases.

Unicode is an industry standard for representing text that enables consistent representation of text regardless of language. Symbols in Unicode are assigned unique "code points". Code points may be represented as binary or hexadecimal values for example. An example code point is written as "U+xxxx" where "xxxx" represents a number associated with the code point, e.g., "U+0065" which represents the letter "e". Encoding a language such as traditional Chinese requires a much larger range of values, or code points when compared to ASCII for example. When checking a particular Unicode code point to determine if it really should be a different word, there is no previously known method to utilized related characteristics associated with the word to determine how close two words are to one another or whether an input error may have occurred for example.

Japanese is another example of a logographic language. Japanese is written using three types of symbols. Kanji symbols include ideographic and pictographic characters adopted from the Chinese language that fit into less than 20 geometric structures. Conceptual words in Japanese such as verbs, adjectives and names for example are generally written using Kanji. Kana symbols are phonetic symbols developed in Japan. Each kana symbol is a phonetic representation of a syllable. Kana is written in one of two ways depending on the type of word it represents, namely hiragana and katakana. Hiragana symbols are utilized in writing native words not written in kanji and inflectional endings of kanji words. Katakana is utilized in writing foreign words. In addition, Romanization of Japanese words is accomplished using 22 roman characters and 2 diacritical marks. Homophones, words sounding alike with different meaning may be represented with different kanji. There are a large number of homophones in Japanese and hence Romanized Japanese is at times difficult to understand even in context. For verbal input methods, homophones present a very real possibility for erroneous data entry. There is no concept of capital versus lowercase letters in Japanese, unlike English. Hence normalization of case in Japanese (for example to all lowercase) before comparison is not possible and hence not needed for comparison purposes. There are two types of Romanization utilized in writing Japanese, Romaji and Hepburn that differ slightly from one another. Although Japanese kanji officially about 2,000 characters, these characters may be mixed with phonetic symbols that make heterographs, i.e., words that are spelled differently but sound and mean the same thing. Erroneous homophone data entry and correct heterograph entry yield data values that may not yield exact spelling matches. Non-exact spelling matches in fields that should be the same signify potential data object merging problems.

Input method editors (IME's) are utilized in entering complex languages into a computer system. Japanese may be entered into a computer in many different ways, including the use of an IME. Use of a Japanese input method editor (IME) on a computer system allows for the selection of characters phonetically, via hiragana and katakana and through use of radicals for example. In addition, Romanized typing of Japanese words on a keyboard or IME is another entry method. In this type of entry, the computer guesses the correct symbol based on the Romanized input and underlines the entry as tentative. Some IME's allow for the entry of a SPACE character to yield a list from which to pick related symbols. Symbols near the correct entry (above or below in the list) may occasionally be accidentally chosen for example. Characters that are close to one another on an IME (next to or above or below the correct symbol in a table) are potential erroneous entry values as a user entering text may select a character near the correct symbol. There are no prior known systems that decompose Unicode code points into related code points based on the type of IME used for data entry.

Chinese may also be entered into computer systems via IME's by breaking up the logograms via structure such as with the Cangjie or Wubi method of typing Chinese, or using phonetic systems such as Zhuyin or Pinyin and selecting possible choices from lists. Since the data entry may be to a closely related erroneous selection, duplicate data objects may result. For example, erroneous selection from a list may result in the entry of a selection that is one logogram away from the desired one. This problem is not unique amongst Japanese and Chinese and is related to any language having a large number of Unicode code points.

Similar issues exist in the entry of other languages such as Korean and the nearly extinct script version of Vietnamese.

When comparing data objects, for example two strings encoded in ASCII, character by character, one word may contain a character that is not in a second word, or the second word may not be found in a dictionary for example. If the rest of the data in each data object compares favorably, then the two objects may actually represent the same data object and hence, may be consolidated. Comparing objects in ASCII is relatively easy since the domain is small (128 characters) and since words constructed in this domain are readily comparable letter by letter.

Comparing strings in Unicode written in languages with small numbers of character sets involves checking for accent marks over characters. For example, comparing strings that include letters having accent marks is performed by transforming single accented characters into corresponding combining sequences. This process is defined as "Unicode normalization". For example, comparing U+00E9 (a latin small letter e with an acute accent mark) involves breaking the letter into two letters, namely U+0065 and U+0301, i.e., "e" and the acute accent mark combining character so that "e" can be compared against the accented version. Unicode normalization is described in Unicode Technical Report UAX 15. Another term for breaking characters with diacritics is "decomposition".

Currently, systems attempting to consolidate data objects that actually represent the same object perform string comparisons with Unicode strings and only find exact matches. Hence only exact copies of data objects can currently be consolidated via existing methods. Hence, current systems are highly inefficient when comparing similar strings when the strings are encoded in Unicode that are not exact matches since the domain is so large. There are no known systems that compare closely related data objects in Unicode, e.g., for large characters sets such as Japanese or traditional Chinese, for consolidation.

There are no known comparison systems that decompose logograms or Unicode representations thereof based on the input method used to enter the Unicode string. For at least the limitations described above there is a need for a system and method for performing Unicode matching for comparing and merging similar data objects having Unicode strings that are equivalent yet not exact matches.

BRIEF SUMMARY OF THE INVENTION

One or more embodiments of the invention enable a system and method for performing Unicode matching for comparing and merging similar data objects having Unicode strings that are equivalent yet not exact matches. Unicode characters are characterized by the number of strokes, stroke order, radicals involved, geometry, phonemes and in association with input method editor and keyboard characteristics such as location of a character on an IME or keyboard. Another characteristic associated with code point is the number of graphical user interface interactions used in entering the character, e.g., on a mobile device using tapping techniques. For example, entering an "a" on a mobile device keyboard may take 1 tap of the number 2 key, while entering a "b" may take 2 taps. These characteristics associated with code points and IME's are utilized to create subdomains for matching and determining "distance" to other Unicode code points, e.g., how far away in an IME list of characters two characters are away from one another (for example the number of keyboard keys away from each other two characters are). This allows for determining whether a close, yet incorrect data entry may have taken place for example. Embodiments enable the merging of similar data objects into master data objects when Unicode strings in the data objects have similar yet not exact matches. This allows for merging large data sets where minor differences or spelling errors introduce data into a database that represents duplicate data.

One or more embodiments of the invention are implemented on a computer system having computer memory and a processing unit. Embodiments obtain two data objects and obtain and compare Unicode strings within a particular field in each data object to one another. Generally the fields are associated with a particular language although more than one language may exist in a string. For portions of the strings that do not match, the substrings are compared using characteristics associated with the code point, e.g., how many keys separate the two code points on a keyboard, or how many cells away from each other in an IME GUI table two code points are. For data entered via mobile devices, such as a mobile wherehouse scanner, where tapping of a given key a given number of times is utilized for data entry, the characteristic associated with the code point is the number of GUI interactions or key presses associated with each code point. The "distance" calculated is the number of keys, cells, list items, or interactions that separate the two code points. Using IME's/keyboards that allow for entry of radicals, strokes or other entities associated with a code point entry provide characteristics utilized in calculating distances that are associated with the IME/keyboard and code point. If a distance of zero occurs, i.e., two code points may be interchanged with one another a report of the match may occur. In other instances where a "close" key or list entry would have produced a match, a tentative match may be reported.

The system may set characteristics associated with code points and associated IME's/keyboards via tables or algorithmic functions from which to calculate distances with minimal storage requirements. Different characteristic values result from indexing IME's via pronunciation, character structure such as radicals used/number of radicals, etc. In addition, use of different keyboards results in setting characteristics for code points that differ based on the keyboard used for data entry for example. In one scenario, a code point associated with a keyboard such as a computer keyboard may have an associated "location" characteristic from which to calculate distances to other code points/key locations. In yet another scenario, a code point associated with a mobile device keyboard may also have an associated "GUI interactions" characteristic from which to calculate distances to other code points based on the number of graphical user interface interactions a given code point is entered with via a given key.

When calculating the distance between two glyphs on an IME, any type of units may be utilized including the number of keys between the two glyphs, number of list entries separating the glyphs, number of pixels between the glyphs, number of rows or columns or any other quantity that represents how close one glyph is to another. When calculating distance between two keys on a keyboard associated with two code points, the number of keys away from another or number of millimeters between the keys may also be utilized. Another other characteristic that represents distance between to keys in any units may be utilized. Furthermore, characteristics of the code points themselves irrespective of IME's or keyboards may be utilized in calculating distance. Examples of characteristics of the code points that may be utilized independently or in association with an IME or keyboard include the number of strokes in a code point, number of non-matching radicals not in common between two code points, or whether two sounds associated with the two code points are equal or not, which may be utilized to yield a Boolean distance of true or false.

Regardless of the characteristic utilized in comparing, and regardless of the IME/keyboard utilized by an external user in entering data, embodiments of the invention may be configured to iterate over all such characteristics to find a minimum distance. The system may automatically merge two data objects that contain strings that are not exact matches but which should have matched via phoneme or probable data entry error. Alternatively, the system may report a tentative match between two objects if the distance between suspected equivalent code points is within a threshold value.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A system and method for performing Unicode matching for comparing and merging similar data objects having Unicode strings that are equivalent yet not exact matches will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
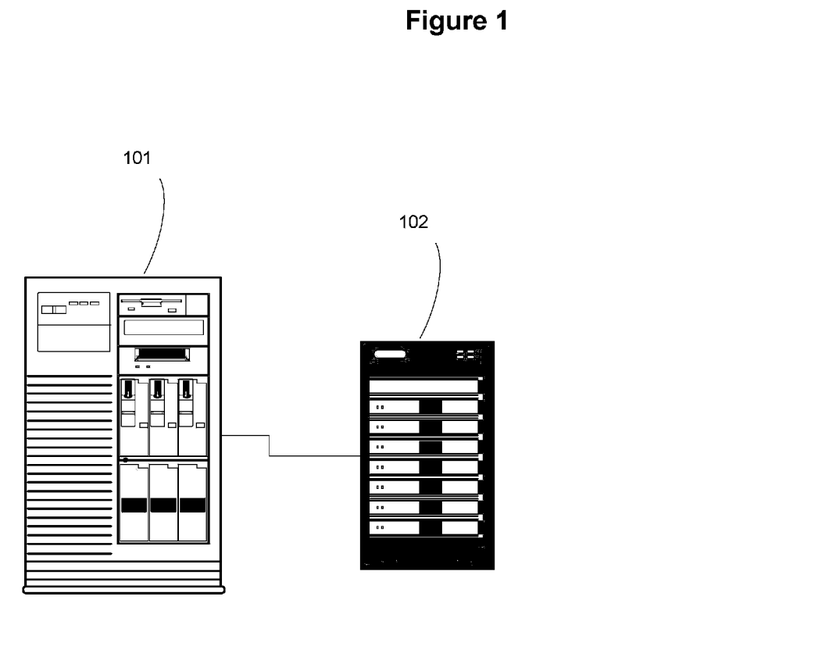
FIG. 1 shows an embodiment of the physical hardware utilized in one or more embodiments of the invention.

FIG. 1 shows an embodiment of the physical hardware utilized in one or more embodiments of the invention. One or more embodiments of the invention are implemented on computer system 101 having computer memory and a processing unit. Computer system 101 may house a database or indirectly couple with database server 102 for example. Embodiments obtain two data objects from the database in database server 102 and obtain and compare Unicode strings within a particular field in each data object to one another. Generally the fields are associated with a particular language although more than one language may exist in a string. Any type of computer processor or hardware may be utilized to implement embodiments of the invention.

Figure 2:
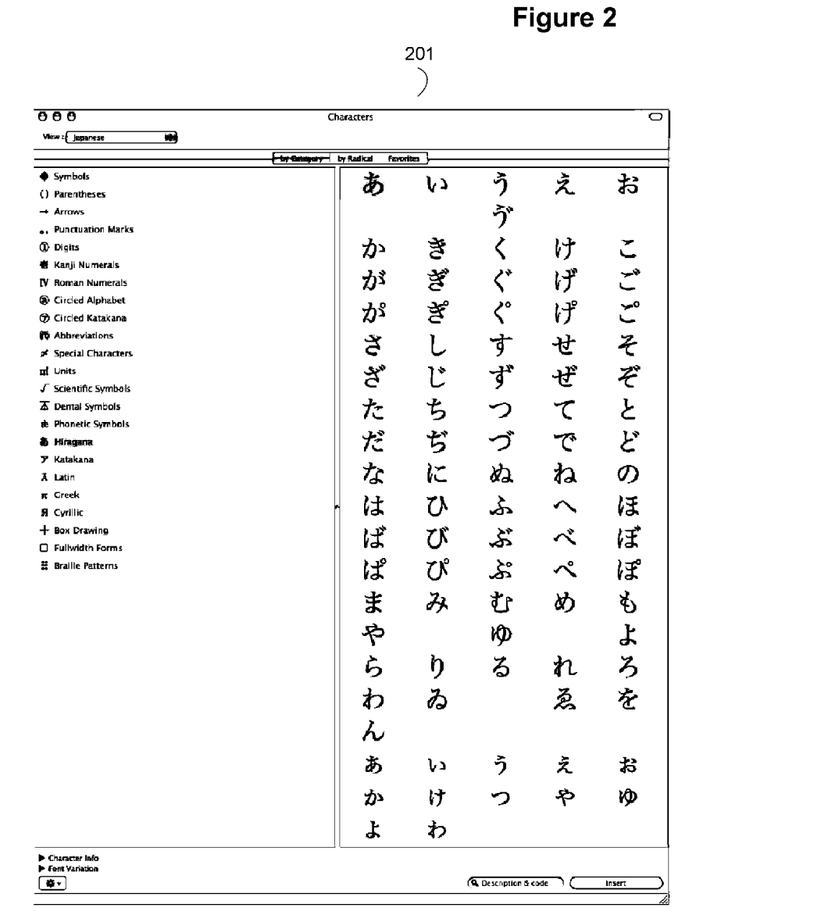
FIG. 2 shows an input method editor for entering hiragana text.
Figure 3:
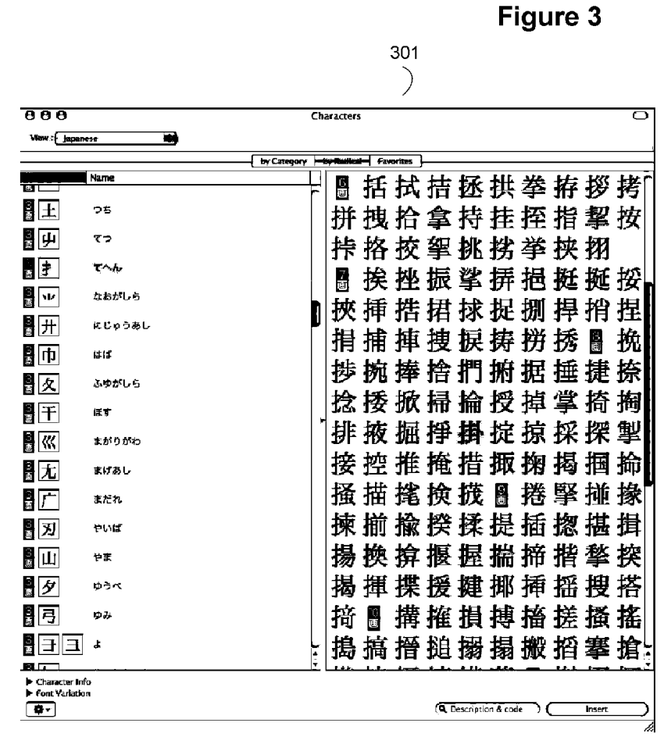
FIG. 3 shows an input method editor for entering kanji text via radical.
Figure 4:
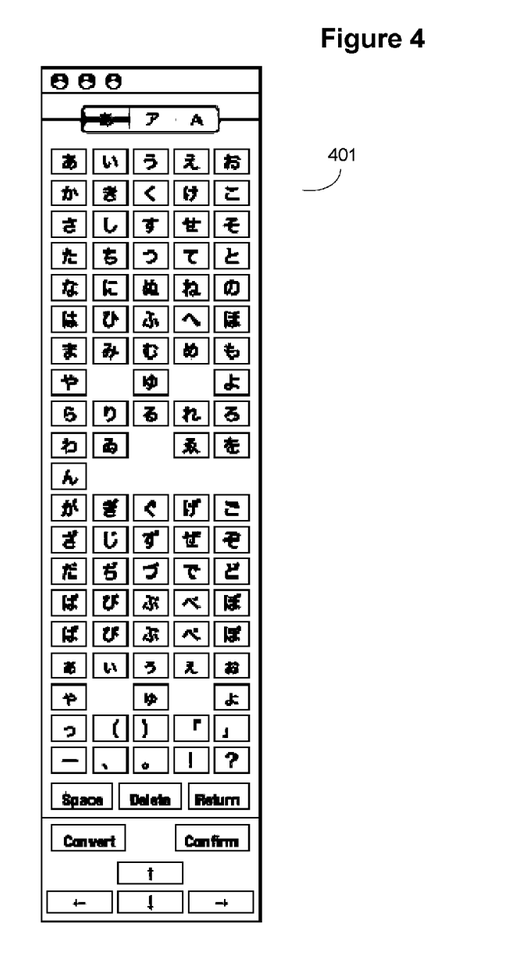
FIG. 4 shows an alternate input method editor for entering hiragana.
Figure 5:
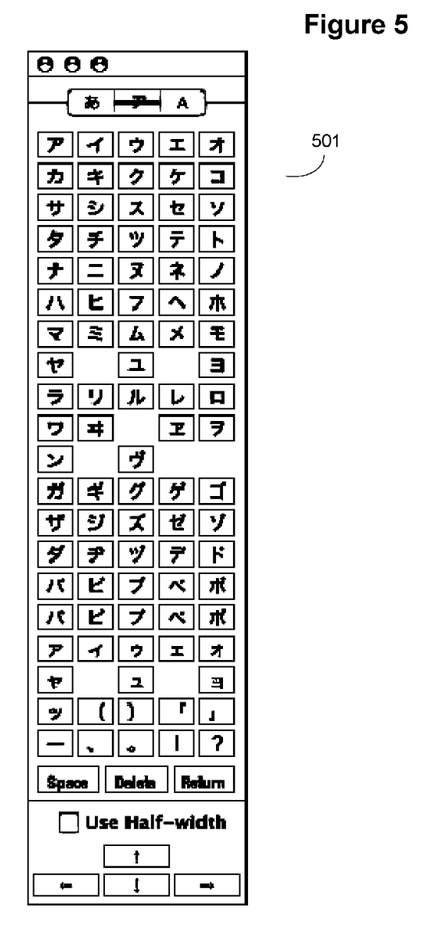
FIG. 5 shows an input method editor for entering katakana.
Figure 6:
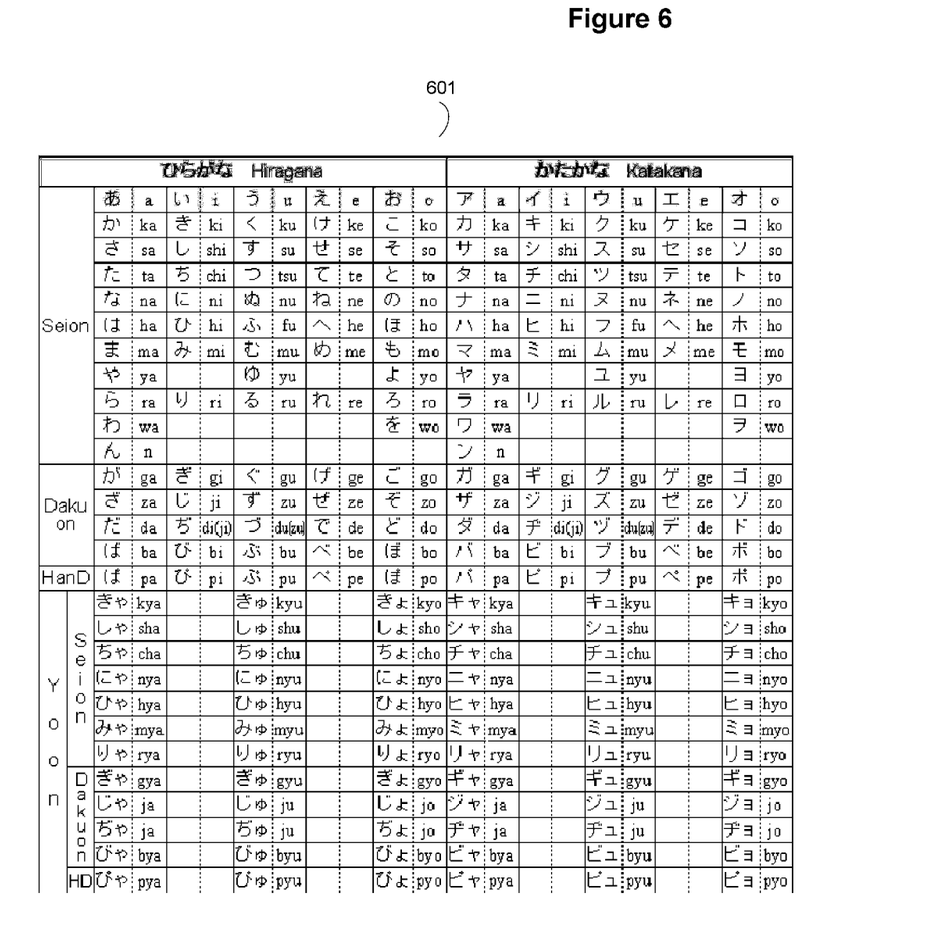
FIG. 6 shows a table with hiragana and katakana Romanizations.

FIG. 2 shows input method editor (IME) 201 for entering hiragana text. FIG. 3 shows input method editor 301 for entering kanji text via radical. FIG. 4 shows alternate input method editor 401 for entering hiragana. FIG. 5 shows input method editor 501 for entering katakana. Each of these input method editors allow for the entry of Unicode code points for Japanese words, however each input method editor differs in the location characteristic of where particular characters, radicals and phonemes are located on the graphical user interface. Unicode characters as displayed in FIGS. 2-5 are characterized using embodiments of the system by the number of strokes, stroke order, radicals involved, geometry, phonemes as found in a dictionary for example and further in association with at least one input method editor and keyboard characteristics such as location of a character on the input method editor or keyboard. For example, "KA" is shown as the third row and first column of the IME of FIG. 2, while "KE" is shown as the third row and fourth column of the IME of FIG. 2. FIG. 6 shows a table 601 with hiragana and katakana Romanizations for the reader unfamiliar with Japanese glyphs representative of Unicode code points.

Another characteristic associated with code point is the number of graphical user interface interactions used in entering the character, e.g., on a mobile device using tapping techniques. For example, using the Romanized version of the kana, entry of a "KA" character takes 1 graphical user interface interaction, e.g., click of the number 2 key on a mobile device keyboard. Entry of "KE" takes 4 clicks of the number 2 key. This means that the distance between "KA" and "KE" is 3, while the distance between "KA" and "SA" is 1 since the number of graphical user interface interactions are equal, yet the key entered is the number 3 key, which is a distance of one column away from the number 2 key on the keyboard. The distance between "KA" and "MO" is 6 since the number 2 key is two rows (greater of two rows and one column) away from the 7 key and 4 extra graphical user interface interactions in difference. Hence it may be possible for an incorrect entry of "SA" in place of "KA", it is unlikely that "MO" was intended when "KA" was entered by a user.

For a keyboard layout of:

| 1 | 2 | 3 |
|---|---|---|
| 4 | 5 | 6 |
| 7 | 8 | 9 |
|   | 0 |   | wherein the keys have associated values that are tapped through sequentially as follows:

(1) A I U E O a i u e o
(2) KA KI KU KE KO GA GI GU GE GO (3) SA SHI SU SE So ZA JI ZU ZE ZO
(4) TA CHI TSU TE TO DA DI DU DE DO tsu
(5) NA NI NU NE NO
(6) HA HI FU HE HO BA BI BU BE BO
(7) MA MI MU ME MO PA PI PU PE PO
(8) YA YU YO ya yu yo
(9) RA RI RU RE RO
(0) WA WO N wa Kanji is generally entered via mobile device via directional keys on the mobile keyboard. An alternative method for entry of Japanese is via western phone key presses using Romanized entry, however the number of keystrokes is much greater.

The characteristics associated with code points and associated IME's are utilized to create subdomains for matching and determining "distance" to other Unicode code points, e.g., how far away in an IME list of characters two characters are away from one another (for example the number of keyboard keys away from each other two characters are). This allows for determining whether a close, yet incorrect data entry may have taken place for example. Embodiments enable the merging of similar data objects into master data objects when Unicode strings in the data objects have similar yet not exact matches. This allows for merging large data sets where minor differences or spelling errors introduce data into a database that represents duplicate data.

Figure 7:
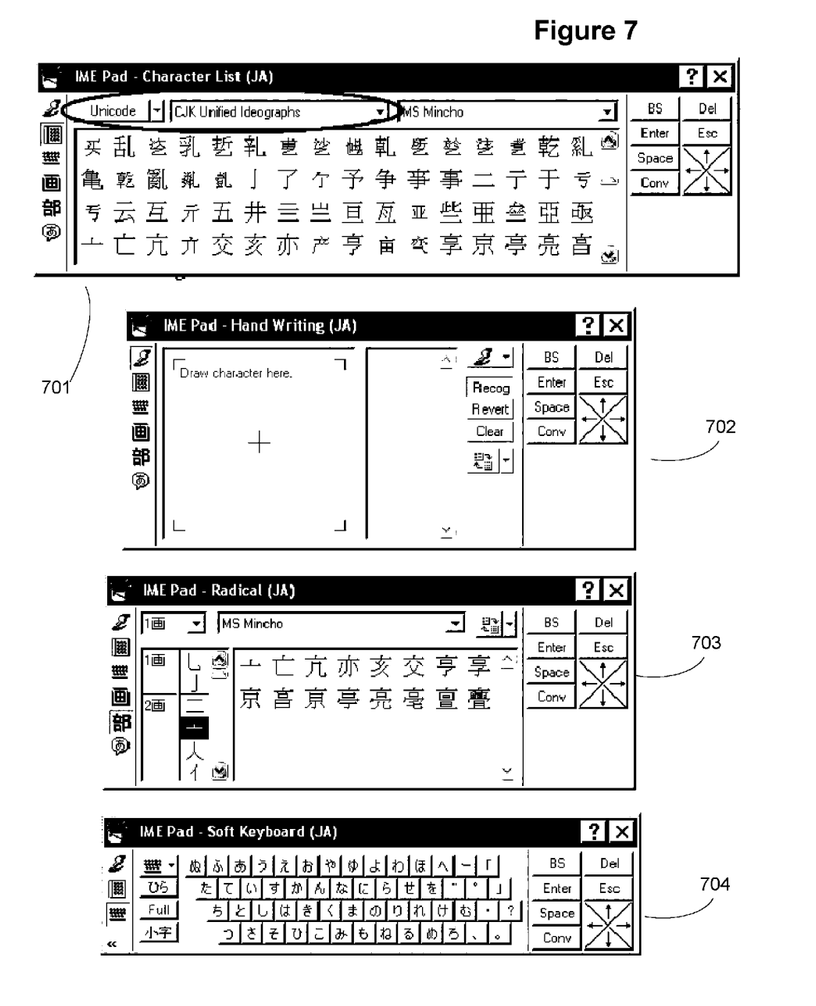
FIG. 7 shows alternate input method editors for entering ideographs, written characters, radicals and Japanese softkeys associated with a soft keyboard.

FIG. 7 shows alternate input method editors for entering ideographs 701, written characters 702, radicals 703 and Japanese soft-keys 704 associated with a soft keyboard. Although many input method editors exist, each Unicode code point has an associated set of characteristics inherent to the associated glyph and in addition to characteristics associated with each input method editor that can be used in entering the code point into the system. For example, a location characteristic of a code point such as "KA" can be implemented as "row 2, column 5" of the Japanese soft keyboard 704. Alternatively, kanji such as "KA" shown highlighted in the ninth visible row (18th row without the scroll bar scrolled down), and 5th column hence has a location characteristic of row 18, column 5 in the radical input method editor shown in FIG. 3.

Figure 8:
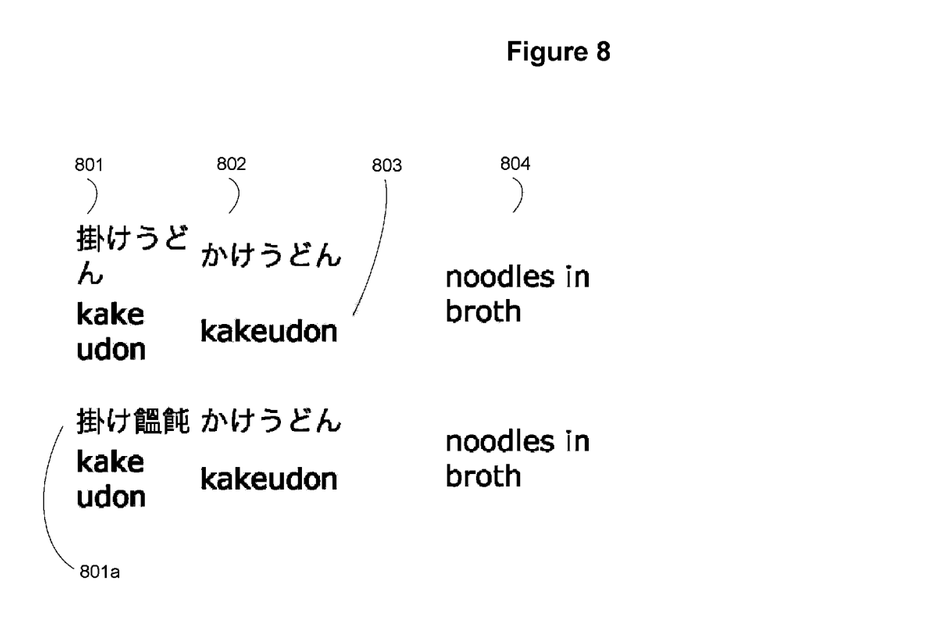
FIG. 8 shows a table containing Japanese and Romanized versions of a string of text along with the English translation thereof.

FIG. 8 shows a table containing Japanese and Romanized versions of a string of text along with the English translation thereof. Specifically, kanji/hiragana filed 801 of Romanized field 803 "kakeudon" a (type of noodles in broth) is stored as a string of Unicode code points. Likewise, kanji/hiragana field 801a is stored with a different spelling having the same sound which is also used in Japan to represent this type of food product. Field 802 also contains a valid hiragana version of "kakeudon" that is used to represent this type of food product. Field 804 represents the English translation of the product name. Values in fields 801, 801a and 802 are commonly used for the same product. Hence multiple code point sets that are not equal yet represent equivalent data result in duplicate data objects in the system.

Figure 9:
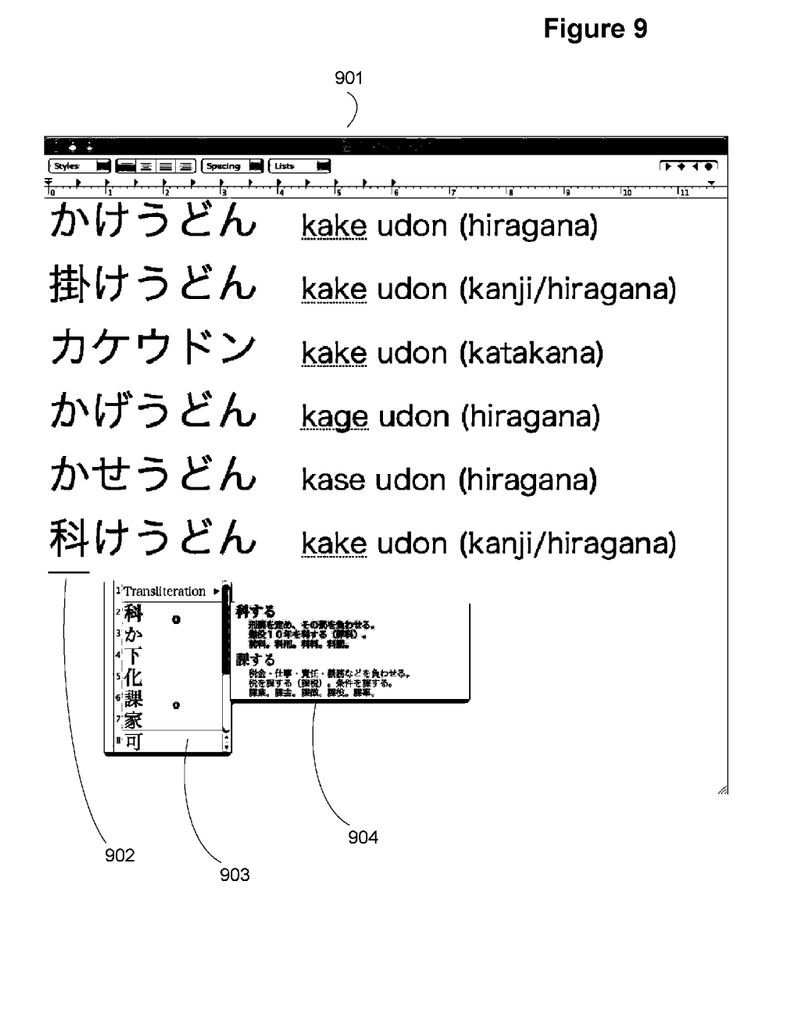
FIG. 9 shows a multi-lingual editor containing Japanese kanji, hiragana and katakana symbols and Romanized versions of a string of text along with an input method editor for entering text without a keyboard.

FIG. 9 shows multi-lingual editor 901 containing Japanese kanji, hiragana and katakana symbols and Romanized versions of a string of text along with another embedded input method editor for entering text without typing characters on a keyboard. In this example, the first two rows are spelled differently yet may be found to be equivalent through phoneme characteristics associated with the code points. The third row is written in katakana, which would not be utilized for a native Japanese word, however with automated translation of words, or outsourced data entry to third world countries, there are times where phonetically equivalent glyphs may be erroneously entered, also for example with voice recognition. Hence, row 3 is a phonetic equivalent to rows 1 and 2. Row 4 is a more difficult problem in that there is a non-match with the second word, i.e., code point, wherein "KA" is erroneously "GA". Since most of the remaining characters in the string match these two code points may be compared with one or more characteristics inherent in the glyph or associated with input method editors. For example, as the distance between "KA" and "GA" as per FIG. 4 is 10 rows, it is unlikely that the error came from this input method editor. Since "KA" and "GA" utilize the same main radical, it is more likely that a radical editor or mobile device keypad was utilized for data entry since "KA" and "GA" have a distance of 5 as per the tapping techniques discussion above. Depending on a threshold value that may be set, this value of 5 may trigger a tentative match or if the threshold value is set lower, may result in no report generation. Glyph 902 is shown with an underscore under it to denote that the character is being entered via an input method editor, for example via the keyboard and is a tentative choice. Pressing the space bar displays embedded input method editor 903. Computing the distance as 1 between the erroneous character 902 shown (a version of KA that sounds the same but cannot be used in this word) and KA, i.e., the entry in the list one row down results in a distance calculation that may trigger a report of a match or tentative match for example. Supplemental information box 904 is utilized to display more information related to the glyph to aid in selecting the proper code point.

Figure 10:
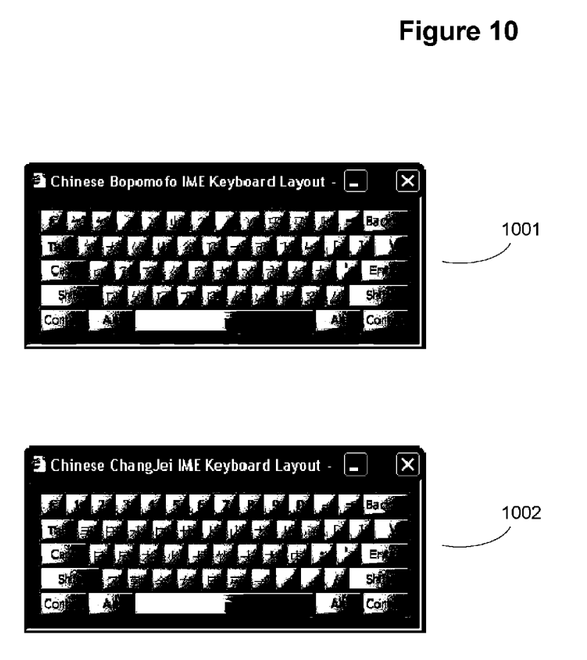
FIG. 10 shows two IME's for Chinese language data entry.

FIG. 10 shows two IME's for Chinese language data entry. Sequences of keystrokes may be utilized as the characteristic associated with these input method editors to check for particular keystroke sequence differences between two code points. Any other method for determining distance between two code points in association with input method editors is in keeping with the spirit of the invention.

The system may set characteristics associated with code points and associated IME's/keyboards via tables or algorithmic functions from which to calculate distances with minimal storage requirements. Different characteristic values result from indexing IME's via pronunciation, character structure such as radicals used/number of radicals, etc. In addition, use of different keyboards results in setting characteristics for code points that differ based on the keyboard used for data entry for example. In one scenario, a code point associated with a keyboard such as a computer keyboard may have an associated "location" characteristic from which to calculate distances to other code points/key locations. In yet another scenario, a code point associated with a mobile device keyboard may also have an associated "GUI interactions" characteristic from which to calculate distances to other code points based on the number of graphical user interface interactions a given code point is entered with via a given key.

Figure 11:
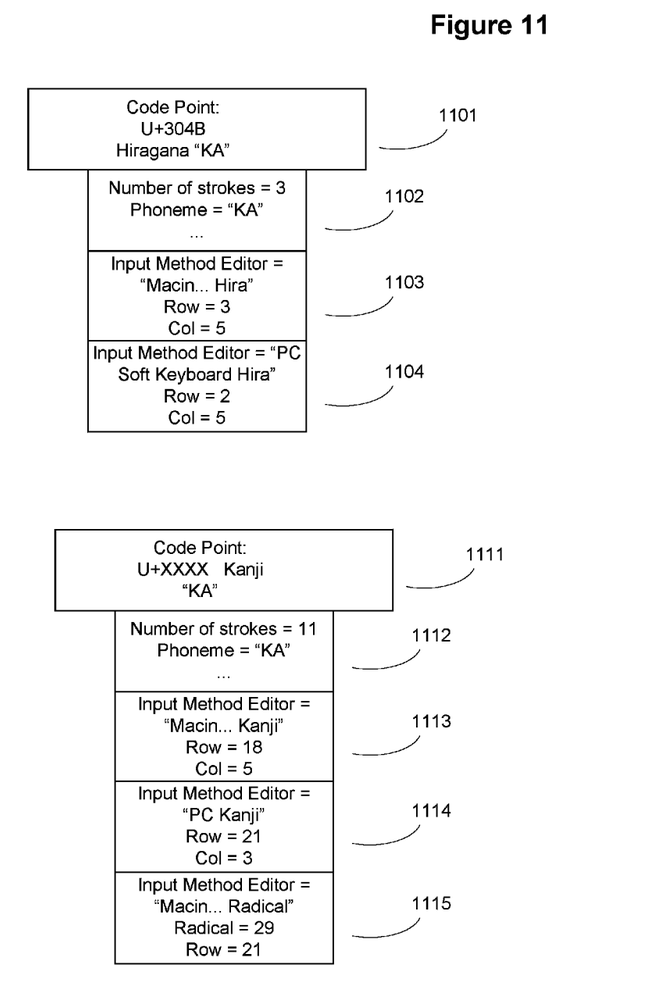
FIG. 11 shows an implementation of inherent and input method editor associated characteristics utilized in one or more embodiments of the invention to calculate distance between two code points.

FIG. 11 shows an implementation of inherent and input method editor associated characteristics utilized in one or more embodiments of the invention to calculate distance between two code points. In this example code point 1101 represents the hiragana word "A" while code point 1111 represents one of the many kanji versions of the word "KA". In this example, the inherent characteristics 1102 include the number of strokes that make up the two characters which is 3 and 11 respectively giving a distance of 8 for stroke based input method editors. The phoneme for both characters is identical which may or may not be utilized for matching based on the particular language being compared. In addition, characteristics associated with the code point and various input method editors are also stored (or calculated on the fly for minimal storage implementations). Examples of characteristics associated with input method editors for given code points include location characteristic 1103 "row=3" and "column=5" for example as found in the "Macin . . . Hira" IME as per FIG. 2. For the "PC Soft Keyboard Hira" IME, the location characteristic 1104 is found to be "row=2" and "column=5" as shown in IME 704 in FIG. 7. Hence, when comparing two words, multiple location characteristics associated with different input method editors may be utilized to find different distances between two code points. As shown in code point 1111, the inherent characteristics include the number of strokes in the character which is 11, and the input method editor related characteristics associated with "Macin . . . Kanji" 1113, "PC Kanji" 1114 and "Macin . . . Radical" 1115. Comparing two code points using input method editor associated characteristics may result in small distances between characters that over time may be utilized to determine the actual input method editor utilized for data entry given enough "close errors" if the input method editor used is not known.

In one or more embodiments of the invention the characteristics associated with each code point and associated input method editors may be implemented as a list of characteristics per input method editor which include "row/column" associated with a table or keyboard for example, "row" associated with a list, "number of GUI interactions", "radical number" for selecting a particular list having a "row", "pixel x/y" or any other combination of quantities that define a characteristic which may be utilized to determine distance between two code points. When calculating the distance between two glyphs on an IME, any type of units may be utilized including the number of keys between the two glyphs, number of list entries separating the glyphs, number of pixels between the glyphs, number of rows or columns or any other quantity that represents how close one glyph is to another. When calculating distance between two keys on a keyboard associated with two code points, the number of keys away from another or number of millimeters between the keys may also be utilized. Another other characteristic that represents distance between to keys in any units may be utilized. Furthermore, characteristics of the code points themselves irrespective of IME's or keyboards may be utilized in calculating distance. Examples of characteristics of the code points that may be utilized independently or in association with an IME or keyboard include the number of strokes in a code point, number of non-matching radicals not in common between two code points, or whether two sounds associated with the two code points are equal or not, which may be utilized to yield a Boolean distance of true or false.

While the invention herein disclosed has been described by means of specific embodiments and applications thereof, numerous modifications and variations could be made thereto by those skilled in the art without departing from the scope of the invention set forth in the claims.

What is claimed is:

1. A method of performing Unicode matching, comprising:
   receiving, at a computer processor, a first data object from a first database;
   receiving, at the computer processor, a second data object from a second database;
   determining by the computer processor a first Unicode string associated with a language from a field in said first data object;
   determining by the computer processor a second Unicode string associated with said language from said field in said second data object;
   comparing by the computer processor said first Unicode string and said second Unicode string;
   obtaining by the computer processor a non-empty set of non-exact match code points associated with said first Unicode string and said second Unicode string;
   automatically comparing by the computer processor entries from said non-empty set of said non-exact match code points comprising a first code point from said first Unicode string to a second code point in said second Unicode string wherein a first characteristic associated with said first code point is utilized to compare against a second characteristic associated with said second code point to obtain a distance between said first code point and said second code point, wherein said characteristics are associated with numbers of graphical user interface interactions required to enter a single-character glyph and said distance is set to a mathematical difference of (i) graphical user interface interactions to select a first single character glyph representing said first code point and (ii) graphical user interface interactions to select a second single character glyph representing said second code point; and,
   reporting from the computer processor a match if said distance is zero and reporting from the computer processor a tentative match if said distance is within a non-zero threshold.

2. The method of performing Unicode matching according to claim 1, further comprising:
   determining said characteristics based at least in part on an input method editor identifier associated with the first or second data objects.

3. The method of performing Unicode matching according to claim 1, wherein the graphical user interface comprises:
   a computer keyboard.

4. The method of performing Unicode matching according to claim 1, wherein the graphical user interface comprises:
   a mobile device keyboard.

5. A method of performing Unicode matching, comprising:
   receiving, at a computer processor, a first data object from a first database;
   receiving, at the computer processor, a second data object from a second database;
   determining by the computer processor a first Unicode string associated with a language From a field in said First data object;
   determining by the computer processor a second Unicode string associated with said language from said field in said second data object;
   comparing by the computer processor said first Unicode string and said second Unicode string;
   obtaining by the computer processor a non-empty set of non-exact match code points associated with said first Unicode string and said second Unicode string;
   automatically comparing by the computer processor entries from said non-empty set of said non-exact match code points comprising a first code point from said first Unicode string to a second code point in said second Unicode string wherein a first characteristic associated with said first code point is utilized to compare against a second characteristic associated with said second code point to obtain a distance between said first code point and said second code point, wherein said characteristics are associated with numbers of graphical user interface interactions of strokes to write a single-character glyph and said distance is set to a number of strokes difference between (i) strokes that make up a First single-character glyph representing said first code point and {ii) strokes that make up a second single-character glyph representing said second code point; and, reporting from the computer processor a match if said distance is zero and reporting from the computer processor a tentative match if said distance is within a non-zero threshold.

6. The method of performing Unicode matching according to claim 5, further comprising:
determining said characteristics based at least in part on an input method editor identifier associated with the first or second data objects.

7. The method of performing Unicode matching according to claim 5, wherein the graphical user interface comprises: a computer keyboard.

8. The method of performing Unicode matching according to claim 5, wherein the graphical user interface comprises: a mobile device keyboard.

9. The method of performing Unicode matching according to claim 5, wherein said automatic comparing further includes wherein a first additional characteristic associated with said first code point is utilized to compare against a second additional characteristic associated with said second code point to obtain an additional distance between said first code point and said second code point, wherein said additional characteristics are associated with locations on a keyboard and said additional distance is set to a mathematical difference of a number of keys between a first key representing said first code point location and a second key representing said second code point location on said keyboard.

\* \* \* \* \*